United States Patent [19]
Bubula

[11] 3,732,892
[45] May 15, 1973

[54] FLUIDIC MOTION LIMITING SYSTEM FOR MOTOR DRIVEN APPARATUS

[75] Inventor: Thomas J. Bubula, Joliet, Ill.

[73] Assignee: Caterpillar Tractor Co., Peoria, Ill.

[22] Filed: Jan. 29, 1971

[21] Appl. No.: 111,085

Related U.S. Application Data

[62] Division of Ser. No. 3,734, Jan. 19, 1970, Pat. No. 3,613,505.

[52] U.S. Cl...................................137/609, 137/81.5
[51] Int. Cl................................................F15c 3/00
[58] Field of Search....................137/81.5, 608, 609; 138/43

[56] References Cited

UNITED STATES PATENTS

| | | | |
|---|---|---|---|
| 3,390,611 | 7/1968 | Warren | 137/81.5 X |
| 1,980,085 | 11/1934 | Perry et al. | 138/43 |
| 2,323,115 | 6/1943 | Bryant | 138/43 |
| 3,347,103 | 10/1967 | High et al. | 137/81.5 UX |
| 3,461,833 | 8/1969 | Boyadjieff | 137/81.5 UX |
| 3,504,689 | 4/1970 | Lazar | 137/81.5 |
| 3,515,161 | 6/1970 | Kent | 137/81.5 |
| 3,530,600 | 9/1970 | Strantz | 137/81.5 X |
| 3,552,365 | 1/1971 | Williams | 137/81.5 X |
| 3,575,209 | 4/1974 | Kast | 137/81.5 X |

*Primary Examiner*—Samuel Scott
*Attorney*—Fryer, Tjensrold, Feix, Phillips & Lempio

[57] ABSTRACT

An operator's control lever which is shifted to actuate a hydraulic motor is returned to the initial position to stop the motor after a preselected amount of travel of a element driven by the motor. A fluidic circuit has means producing digital signals indicative of successive increments of travel of the element and has a counter for storing any preselected number of such signals. When the selected count is reached, a kickout means manipulates the operator's control lever to stop further operation of the motor. The count required to stop the motor, and thus the amount of travel of the element, may be changed by turning of a control knob. The system is applicable, for example, to limiting movement of the lift arms of a loader vehicle.

2 Claims, 4 Drawing Figures

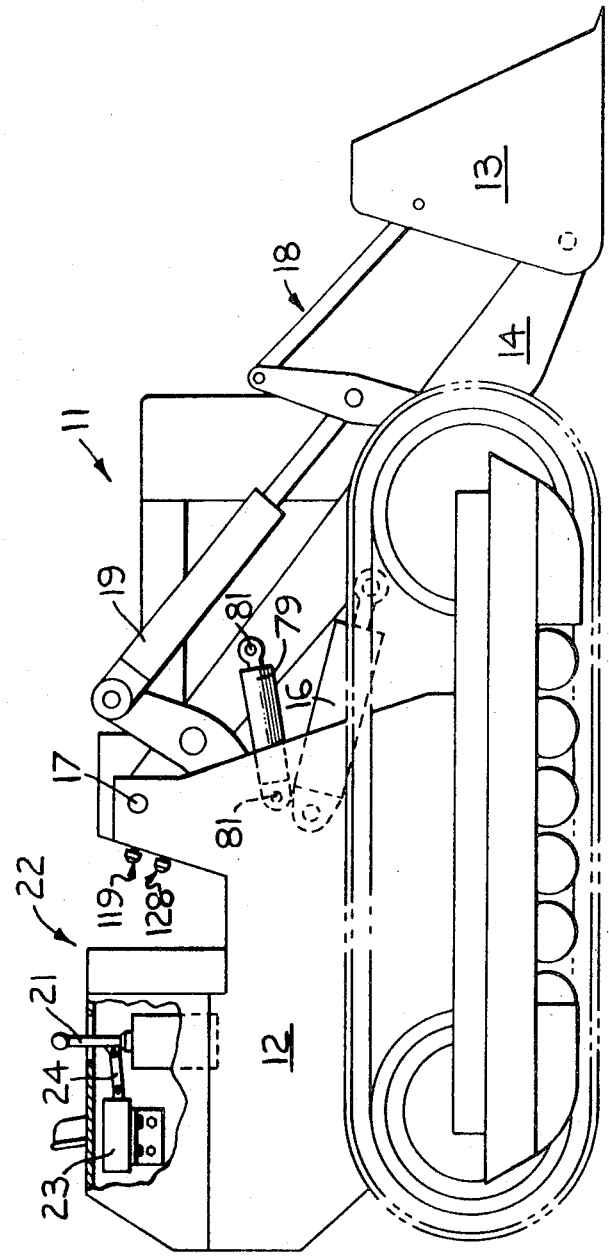

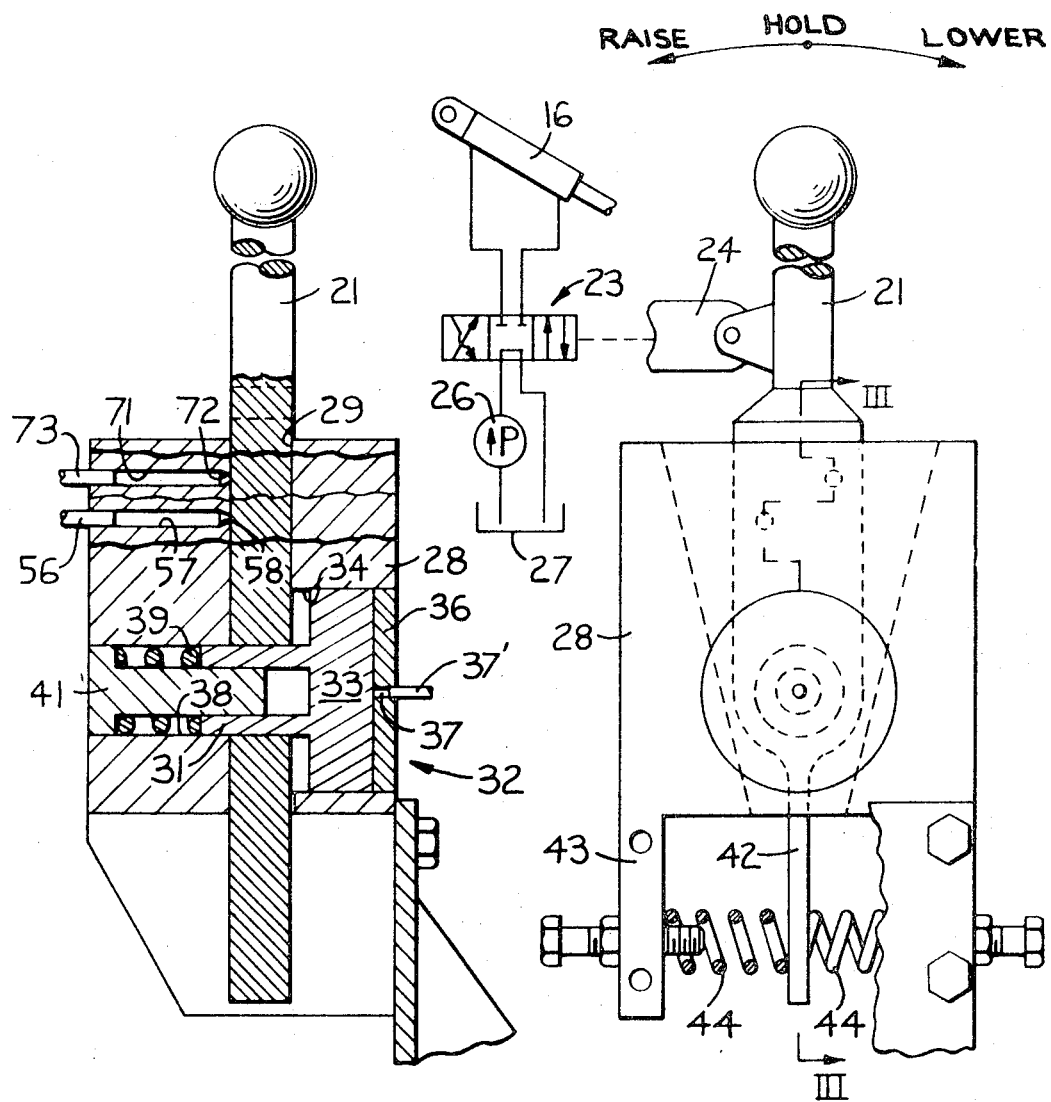

FLUIDIC MOTION LIMITING SYSTEM FOR MOTOR DRIVEN APPARATUS

This is a divisional application of copending U.S. application Ser. No. 3,734 of Thomas J. Bubula, filed Jan. 19, 1970 for "Fluidic Motion Limiting System For Motor Driven Apparatus," which is now U.S. Pat. No. 3,613,505, issued Oct. 19, 1971.

BACKGROUND OF THE INVENTION

This invention relates to systems for limiting the amount of movement of motor driven apparatus and more particularly to a system for stopping the movement of a motor driven element at a preselected point in the travel of the element.

Many forms of motor operated apparatus are equipped with motion limiting means which automatically stops the motor after a predetermined amount of travel of a driven element. In certain equipment of this kind, it is necessary that the operator be able to adjust the system to change the amount of permitted travel of the element. In the absence of cumbersome linkage or complex electrical components, prior motion limiting means of this kind have not been readily adjustable in this manner. In most cases, the operator must shut down the apparatus and leave his normal station and make the necessary adjustments in the area of the moving element. Many such prior systems require that motion sensing means be situated at a location where the possibility of damage is high. Still further, such prior systems tend to be undesirably bulky, costly, prone to jamming and are not readily adaptable to different forms of powered mechanism.

The kick-outs or positioners used to stop raising and lowering of the bucket on a loader vehicle are typical of the motion limiting mechanisms discussed above and the invention will be herein described with reference to a loader, it being apparent that the invention is also applicable to other powered apparatus.

The bucket of a loader is carried by lift arms which are pivoted to a tractor vehicle and one or more hydraulic jacks, responsive to shifting of an operator's lever, provide for raising and lowering of the arms and the bucket. Detents are usually provided to hold the control lever in either of the raise or lower settings so that the operator need only initially position the control lever and may then remove his hand from the lever and turn his attention to other tasks while the bucket rises or drops. Kick-outs of the kind referred to above are mechanisms which sense when the bucket has been lowered or raised to a predetermined desired position and then automatically release the detents so that the control lever returns to the hold position to stop further bucket movement without requiring any action on the part of the operator.

As heretofore constructed, such kick-out systems are subject to the disadvantages of motion limiting means in general as discussed above. Notably, any adjustment of the point of bucket travel at which the kick-outs operate is difficult in that the operator must stop the loader, dismount from his station, and make time consuming and intricate manipulations. When working under conditions where such adjustments are required frequently, operators tend to disregard the kick-out system and to perform all bucket control movements manually thereby diverting their attention from other necessary operations. This is not only a source of inefficiency but may also constitute a safety hazard in that the operator must focus his attention on the bucket at a time when the vehicle is moving. Further, the conventional kick-outs require complex moving mechanisms, including valving and mechanical linkages, which are often damaged by impact from rocks or other material being handled and which frequently jam or otherwise malfunction.

SUMMARY OF THE INVENTION

This invention is a compact, inexpensive and highly reliable motion limiting system for motor driven apparatus which may be readily adjusted to change the limit of motion of an element with such adjustment being made by simply changing the setting of an adjustable control which may be located at any convenient point.

The invention provides means for sensing movement of the motor driven element to produce digital signals in a fluidic logic circuit wherein the accumulated total of such signals is indicative of the distance traveled by the moving element. After a predetermined number of such signals have been generated and counted, the motor control is automatically operated to stop the motor to limit further travel of the moving element. The number of counts needed to effect such action is variable as desired by changing the setting of a control which may be located at a position convenient to the operator.

Accordingly, it is an object of this invention to provide a motion limiting system for motor driven apparatus which may be readily adjusted to effect changes in the limit of motion of a moving element.

It is a further object of the invention to provide a compact, sensitive and versatile motion limiting system for powered mechanisms which system has few moving parts and does not require the disposition of fragile elements at points where the potential for damage is high.

It is still another object of the invention to provide a more convenient and reliable kick-out system for use in conjunction with the operator's controls of load manipulating elements in loader vehicles and the like.

The invention, together with further objects and advantages thereof, will best be understood by reference to the following description of a preferred embodiment in conjunction with the accompanying drawings.

BRIEF DESCRIPTION OF THE DRAWINGS

In the accompanying drawings:

FIG. 1 is a side elevation view of a front end loader, with portions thereof broken out, in which the present invention is utilized for automatic stopping of the raising and lowering of the loader bucket, FIG. 2 is a side elevation view of the operator's lift control lever of the loader of FIG. 1 with certain hydraulic elements, operated by the lever, being shown in schematic form, FIG. 3 is a section view of the operator's control mechanism of FIG. 2 taken along staggered line III—III thereof.

Figure 4:
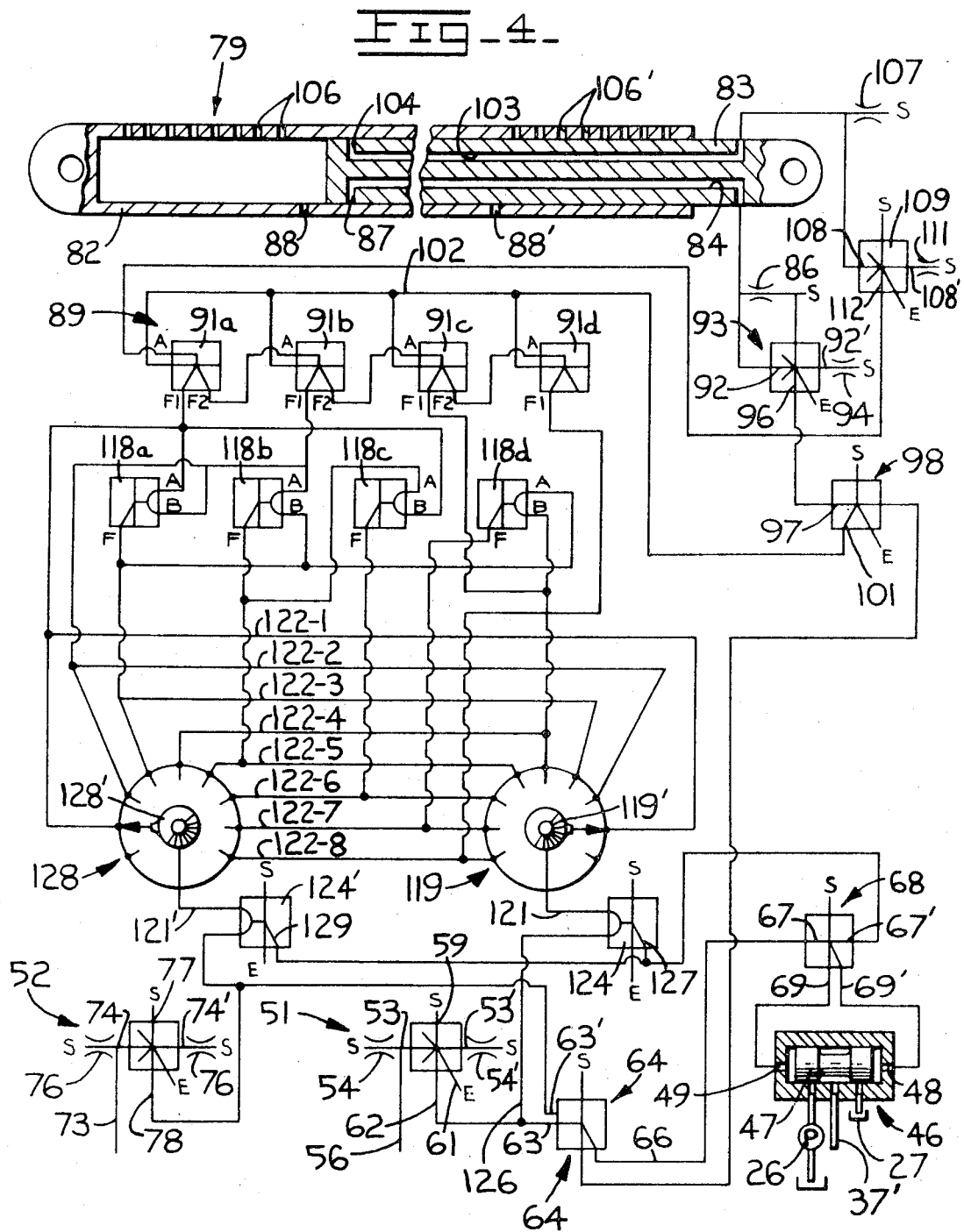
FIG. 4 is a fluidic circuit diagram showing elements of the lift arm motion limiting system of the loader of FIGS. 1 to 3.

Referring initially to FIG. 1 of the drawing, salient elements of a loader 11 include a tractor 12 having a bucket 13 pivoted to the front end of forwardly directed lift arms 14. To provide for vertical travel of the bucket 13, the rearward end of the lift arms are coupled to the tractor body by pivot connections 17 and fluid motors 16, generally a pair of hydraulic jacks, are coupled between the lift arms and the tractor body. Tilt linkage 18 is coupled between the bucket 13 and tractor body to maintain the bucket at a substantially constant inclination as the lift arms 14 are raised or lowered, with the linkage being formed in part of additional hydraulic jacks 19 which provide for pivoting of the bucket relative to the lift arms to perform rack back, dumping and other operations.

The lift motor 16 is controlled by manipulating a control lever 21, situated at the operator's station 22, which connects with a spool valve 23 through linkage 24. As shown schematically in FIG. 2, spool valve 23 may be a three position valve with a RAISE setting at which a pump 26 delivers fluid from a supply reservoir 27 to the head end of lift motor 16 while venting the rod end of the motor to the reservoir. Valve 23 has a LOWER setting at which the output of the pump is transmitted to the rod end of lift motor 16 while the head end is vented and further has an intermediate HOLD setting at which the ports at both ends of the motor are closed while the output of pump 26 is diverted directly back to the reservoir 27. Control lever 21 is pivoted at its base to a support housing 28 for movement between the RAISE, HOLD and LOWER settings and acts to shift the valve 23 between the above described positions thereof through linkage 24.

Referring now to FIG. 3 in conjunction with FIG. 2, the lower end of control lever 21 extends into a slot 29 in support housing 28 and is transpierced by a pivot shaft 31 to provide for the fore and aft movement of the lever. To provide a hydraulically actuated detent mechanism 32 for temporarily holding lever 21 at a selected position, shaft 31 is formed as an axial projection on a piston 33 which is slidable within a circular chamber 34 in the support housing 28 in a direction normal to the plane of movement of lever 21 whereby the piston may be moved to clamp the lever in a selected position. To actuate the piston 33 for this purpose, the outer side of chamber 34 is defined by a circular closure 36 having a port 37 into which high pressure fluid may be admitted and released. Shaft 31 extends through the base of lever 21 and into a bore 38 in the opposite side of the support housing 28 and a compression spring 39, held by a fixed retainer pin 41, acts against the end of the shaft to urge piston 33 away from lever 21 so that the lever is not clamped in a fixed position except when fluid pressure in the chamber 34 overcomes the force of spring.

To urge lever 21 toward the center or HOLD setting, a tab 42 extends downwardly from the lower end of the lever between spaced apart downwardly directed legs 43 of the support housing 28 and one of a pair of compression springs 44 is disclosed between the tab and each leg 43.

The structure of FIGS. 1 to 3 as described to this point provides a means for manually controlling the raising and lowering of the loader lift arms 14 and bucket 13 by manipulating control lever 21. However, the above described mechanism by itself would require that the operator hold lever 21 in either the RAISE or LOWER settings for the full time period required to raise or lower bucket 13 the desired amount. To avoid this requirement, the invention provides fluidic circuitry which actuates the detent mechanism 32 to hold the control lever 21 at each of the RAISE and LOWER positions of the lever until the lift arms and bucket have risen or lowered to predetermined levels at which point the detent mechanism is automatically released enabling springs 44 to return the control lever to the HOLD position and stop further movement of the lift arms.

Referring now to FIG. 4 in conjunction with FIG. 3, the detent mechanism 32 is operated and released by shifting of a two position spool valve 46. Valve 46 has a spool 47 which may be shifted, by application of air under pressure to a first control port 48, to couple the hydraulic fluid pump 26 to a conduit 37' connected to the previously described detent mechanism port 37 thereby actuating the detent to hold the control lever 21 at a selected setting. Application of air under pressure to an opposite port 49 of spool valve 46 shifts spool 47 to connect conduit 37' with the drain reservoir 27 thereby releasing the detent mechanism 32 whereby the control lever 21 is spring returned to the HOLD setting.

Fluidic circuit elements which control the spool valve 46 are shown in FIG. 4 wherein standard symbols for fluidic logic are used with the letter S designating connections to a source of air under pressure and the letter E designating Exhaust or Vent ports of the several fluidic components. While the circuit will be described as utilizing pneumatic components, it will be apparent that the same circuit is adaptable to hydraulic fluidic elements.

In order to actuate the detent mechanism, movement of the control lever 21 into the LOWER or RAISE settings is detected by fluidic Schmitt triggers 51 and 52 respectively. Schmitt trigger 51 has control channels 53 and 53' connected to the air supply S through resistors (flow constrictions) 54 and 54' with control channel 53 also being connected to a conduit 56 to the control lever assembly. Referring now again to FIGS. 2 and 3 in conjunction, conduit 56 connects with a passage 57 in lever support housing 28, the passage having an end 58 situated to be blocked by lever 21 in the HOLD and RAISE settings thereof but which is uncovered, to vent the pressure in conduit 56 when the lever is shifted to the LOWER setting.

Referring again to FIG. 4, this release of pressure from conduit 56 and control channel 53 enables the air flow into the opposite control channel 53' to shift the flow of air through Schmitt trigger 51 from vent channel E to output channel 62. Output channel 62 then transmits air to one input 63 of an OR gate 64 which responds by transmitting air through output channel 66 to one input 67 of an OR gate 68 causing pressure to be switched from a first output channel 69 of OR gate 68 to the second output channel 69' thereof. Output channel 69 connects with port 49 of spool valve 46 while output channel 69' connects with port 48 thereof. Thus, the above described action of OR gate 68 causes spool 47 to shift to couple pump 26 with conduit 37' thereby actuating the detent mechanism 32 of FIG. 3 to clamp the lever 21 at the LOWER setting. Thus, anytime that the operator shifts the lever 21 into the LOWER setting, it is immediately held thereat by the actuation of the detent mechanism 32 as described above.

A similar action occurs if the lever 21 is shifted in the other direction to the RAISE setting. Referring again to FIGS. 2 and 3, a second passage 71 in support housing 28 has an end 72 situated to be blocked by lever 21 when the lever is in the HOLD or LOWER settings but which is uncovered when the lever is moved into the RAISE setting, thereby venting a conduit 73. Referring now again to FIG. 4, conduit 73 connects with the signal input channel 74 of Schmitt trigger 52, the input channel 74 and the opposite control channel 74' being connected to air supply S through resistors 76. As in the previous instance, the release of pressure from conduit 73 enables the air flow into control channel 74' to switch the flow through the Schmitt trigger from the vent channel E to output channel 78. Channel 78 connects with the other input 63' of OR gate 64. Consequently, through the previously described action of OR gates 64 and 68, the movement of the control lever into the RAISE setting also operates spool valve 46 to actuate the detent mechanism 32, thereby holding the control lever at the RAISE setting.

Thus, the control lever is immediately held at either the RAISE or LOWER positions once it is moved to such positions and the operator may remove his hand and direct his attention to controlling other aspects of the vehicle during the period that the lift arms rise or fall. This desirable mode of operation further requires that means be provided for determining when the lift arms have risen or lowered the desired amount and further requires means which then releases the detent automatically so that the control lever springs back to the HOLD position and stops further lift arm movement. Referring now to FIGS. 1 and 4 in combination, a position digitizer cylinder 79 is connected between the body of tractor 12 and lift arms 14, by pivot connections 81, to generate fluidic digital signals indicative of movement of the lift arms.

Referring again to FIG. 4 in particular, digitizer cylinder 79 includes a cylinder 82 and a rod 83 which is slidable therein in an axial direction whereby lowering of the lift arms contracts the rod into the cylinder and raising of the lift arms extends the rod further out of the cylinder. A passage 84 within the rod 83 is coupled to air supply S through a resistor 86 and connects with a port 87 in the side of the rod. Port 87 is normally blocked by the adjacent inner wall of cylinder 82 but passes across a port 88 in the side of the cylinder, as the lift arms approach the lower portion of the downward travel.

Momentary venting of rod port 87 in this manner generates a fluidic signal which conditions a binary counter 89, comprised of a series of fluidic binary counting elements 91, to begin a count indicative of the amount of further downward travel of the lift arms. In particular, the signal input control channel 92 of another fluidic Schmitt trigger 93 is connected to rod passage 84 with the other control channel 92' being connected to air supply S through a resistor 94 whereby the passage of port 87 past port 88 diverts the flow of air in the Schmitt trigger 93 from vent channel E to an output channel 96. Channel 96 connects to one control channel 97 of a fluidic FLIP-FLOP 98 and the signal applied thereto switches the air flow through the FLIP-FLOP from an outlet channel 101, which connects with the reset channel 102 of each of the binary counting elements 91, to a vent channel E of the FLIP-FLOP. This action depressurizes reset lines 102 of the binary counting elements 91 to condition the counter 89 to begin a counting sequence.

Signals indicative of further movement of the rod 83 into cylinder 82 are generated by momentary exhausting of a passage 103 in rod 83 as an end port 104 thereof passes along a series of ports 106 in the wall of cylinder 82. Passage 103 is connected with the air supply S through a resistor 107 and also connects with the signal input channel 108 of another Schmitt trigger 109. The other control channel 108' of Schmitt trigger 109 is connected to the air supply through a resistor 111 and thus passage of port 104 past each of the cylinder ports 106 acts to momentarily divert the air flow through Schmitt trigger 109 from vent E to an output channel 112. Output channel 112 is connected with the signal input A of the first of the series of binary counting devices 91.

Binary counter 89 is comprised of four of the counting devices 91, here identified as 91a, 91b, 91c, and 91d, each having an input A and outputs F1 and F2 in addition to the common reset input 102. The input A of each device 91, other than the first, is coupled to the F2 output of the preceding device so that the sequence operates as a binary counter in a manner understood in the data processing art. In particular, the first device 91a changes state with each incoming signal while the second device 91b changes state with every other incoming signal and device 91c changes state with every fourth signal while the final device 91d changes state only upon the eighth signal of the sequence. Thus, the devices 91 jointly assume a condition after each incoming signal which is unique and indicative of the number of such signals that has been received at that time.

To monitor the count stored in counter 89, to initiate stopping of the downward movement of the loader lift arms at a preselected time, a sequence of four AND gates 118a to 118d are connected between the counting devices 91 and a sequence of eight distinct fluid signal channels 122-1 to 122-8. AND gates 118 function to pressurize the particular one of the channels 122 which corresponds to the number of counts which has been received by counter 89 at any given time. For this purpose, the F1 output of device 91a is coupled to one input A of AND gate 118a and is also coupled directly to channel 122-1. Thus, channel 122-1 is energized when the first count is received by counter 89 inasmuch as device 91a changes state at that time to pressurize its output F1. Output F1 of device 91b is connected with channel 122-2 and also to one input A of AND gate 118b. Thus, channel 122-2 is pressurized after the second incoming signal as 91b changes state at this time to pressurize its output F1. Output F1 of device 91b is also coupled to the other input B of AND gate 118a while the output F of gate 118a is coupled to the third channel 122-3. Thus, the above described connections provide for pressurization of channel 122-3 after the third signal is received, inasmuch as both inputs A and B of AND gate 118a are pressurized at that time and therefore the AND gate transmits pressure to its output F and thus to line 122-3. The output F1 of device 91c is coupled directly to channel 122-4 as device 91c first changes state upon the fourth signal. Channel 122-5 is pressurized upon the fifth signal in that it is coupled to the output F of AND gate 118b which has one input A coupled to output F1 of device 91d and the other input B coupled to output F of AND gate 118a so that the condition existing after the fifth pulse enables gate 118b to transmit pressure to its output F1. To pressurize channel 122-6 after the sixth pulse, the output F of AND gate 118c is coupled to channel 122-6 with the inputs of gate 118c being coupled respectively to the output of AND gate 118b and the F1 output of device 91a. Channel 122-7 is pressurized after the seventh incoming signal through a connection to the output F of AND gate 118d, the two inputs of gate 118 d being connected respectively to the output F of AND gate 118a and the output F1 of counting device 91c. Channel 122-8 is pressurized after the eighth pulse through a direct connection to output F1 of the final counting device 91e which does not change state until the last signal of the sequence is received.

Considering now an important aspect of the invention, the operator is provided with a manually adjustable multi-position fluidic switch 119 for selecting the point at which motion of the lift arm and buckets is to be automatically stopped. As shown in FIG. 1, the switch 119 may include a rotatable knob 119' positioned within easy reach of the operator's hand at operator's station 22, the switch being located on the console at the front of the operator's station in this instance. Referring now again to FIG. 4, switch 119 has a series of settings including an off or zero position and a number of additional positions equal to the number of channels 122, there being eight such additional positions in this example. Rotation of knob 119' to any of the positions thereof connects an output line 121 with a corresponding one of the channels 122. Thus, output line 121 will be pressurized when the particular channel 122 associated with the selected setting of dial 119 is pressurized as described above. Thus, the point in the travel of rod 83 into cylinder 82 at which switch output line 121 is pressurized is determined by the selected setting of switch 119 and may be varied as desired by adjusting the knob 119'.

Pressurizing of the switch output line 121 in this manner transmits air to one input channel of an AND gate 124 which has the other input channel already pressurized through a connection 126 to the previously described output channel 62 of Schmitt trigger 51 which was pressurized by the original manipulation of the control lever. Accordingly, the air flow through AND gate 124 is switched to the output channel 127 of the gate. Output channel 127 is coupled to the second control channel 67' of the previously described OR gate 68 that controls spool valve 46. Receipt of a signal at the second control channel 67' of gate 68 returns the air flow therethrough from port 48 of spool valve 46 back to port 49 thereof thereby shifting spool 47 to vent conduit 37'.

Referring now again to FIGS. 2 and 3 in conjunction, venting of conduit 37' releases the detent mechanism 32 enabling springs 44 to return the control lever 21 to the center or HOLD position. This shifts the lift motor control valve 23 to stop further travel of the lift arms.

Referring now again to FIG. 4, the circuit operates in an essentially similar manner to stop raising of the lift arms at any preselected one of a number of points. As rising of the lift arms extends rod 83 from cylinder 82, an additional port 88' in the cylinder is positioned to momentarily vent port 87 as the lift arms approach the final portion of upward travel. As previously described, the momentary exhausting of rod passage 84, acting through Schmitt trigger 93 and FLIP-FLOP 98 conditions the binary counter 89 for a counting sequence. As the rod 83 extends further, fluidic signals are generated periodically by momentary venting of rod passage 103 by an additional series of ports 106' which are similar to ports 106 but situated near the opposite end of cylinder 82.

Such signals are counted as previously described with respect to lowering of the lift arms. The number of counts required to stop raising of the lift arms is determined by the setting of a second multi-position fluidic switch 128 which is also situated at operator's station 22 of the loader as shown in FIG. 1. Referring again to FIG. 4, setting of a knob 128' of switch 128 at any of the positions thereof other than the initial or OFF position connects an output line 121' with one of the previously described channels 122 each of which is pressurized after a corresponding number of signals have been received at counter 89. Pressurizing of output line 121' because of the accumulation of the requisite number of counts applies air pressure to one of the control channels of an AND gate 124'. The other control channel of gate 124' is coupled to output channel 78 of Schmitt trigger 52. AND gate 124' then transmits air pressure through output channel 129 to control channel 67' of OR gate 68. Gate 68 responds by shifting spool valve 46 to deenergize the detent mechanism 32 of FIGS. 3 and 4 thereby releasing the control lever 21 and stopping further extension of lift motor 16.

Referring now again to FIG. 1, while the motion limiting system has been herein described with reference to the action of the lift motors 16 in raising and lowering the lift arms 14 and bucket 13, it will be apparent that such a system may also be utilized to automatically limit the action of tilt motors 19 in pivoting the bucket 13 about the end of the lift arms. Similarly, it will be apparent that the system is not confined to crawler tractor loaders of the kind herein described for purposes of example, but has diverse usages where motor driven elements are to be automatically stopped at a predetermined and adjustable point in the travel thereof.

What is claimed is:

1. Apparatus for generating a sequence of discrete fluidic digital signals indicative of successive increments of motion of a movable element comprising:
a cylinder having a plurality of vent openings in the wall thereof, said plurality of openings including at least three openings which are spaced apart along the length of said cylinder,
a rod extending coaxially into said cylinder and having a first axially extending internal passage terminating at a port in the sidewall of said rod which port passes sequentially along said openings of said cylinder as said rod moves axially relative thereto, and
means supplying fluid under pressure to said first passage, said means including a flow constriction whereby the fluid pressure in said first passage between said port and said flow constriction is momentarily reduced as said port passes each of said openings of said cylinder.

2. Apparatus for generating fluidic digital signals indicative of successive increments of motion of a movable element comprising:
a cylinder having a plurality of openings spaced apart along the wall thereof,
a rod extending into said cylinder and having a first passage terminating at a port which passes sequentially along said openings of said cylinder as said rod moves relative thereto, and
means supplying fluid under pressure to said first passage, said means including a flow constriction whereby the fluid pressure in said first passage is momentarily reduced as said port passes each of said openings of said cylinder, wherein said rod has a second passage terminating in a second port located to be vented by an opening in said cylinder prior to movement of said port of said first passage into juxtaposition with the first of said openings, said second passage being communicated with said means supplying fluid under pressure through a second flow constriction whereby a reset signal is generated in said second passage prior to the generation of said signals in said first passage of said rod.

* * * * *